United States Patent [19]

Payvar

[11] Patent Number: 4,995,500

[45] Date of Patent: Feb. 26, 1991

[54] GROOVE PATTERN FOR HIGH THERMAL CAPACITY WET CLUTCH

[75] Inventor: Parviz Payvar, Wilmette, Ill.

[73] Assignee: Borg-Warner Corporation, Chicago, Ill.

[21] Appl. No.: 907,937

[22] Filed: Sep. 16, 1986

[51] Int. Cl.[5] .................. F16D 13/64; F16D 13/74
[52] U.S. Cl. .................. 192/107 R; 192/113 B; 188/218 XL
[58] Field of Search ............ 192/107 R, 113 B, 70.12, 192/70.14; 188/218 XL, 264 B, 264 D, 264 E

[56] References Cited

U.S. PATENT DOCUMENTS

| | | | |
|---|---|---|---|
| 2,020,748 | 11/1935 | Waseige | 192/113 B |
| 2,144,223 | 1/1939 | Klocke | 192/107 R |
| 2,728,421 | 12/1955 | Butler | 188/218 XL |
| 2,927,673 | 3/1960 | Sand | 192/107 C |
| 3,063,531 | 11/1962 | Aschauer | 192/113 B |
| 3,073,424 | 1/1963 | Russell | 192/113 B |
| 3,198,295 | 8/1965 | Fangman et al. | 192/113 B X |
| 3,897,860 | 8/1975 | Borck et al. | 192/113 B |
| 4,280,609 | 7/1981 | Cruise | 192/113 B |
| 4,287,978 | 9/1981 | Straub, Jr. | 192/113 B |
| 4,358,001 | 11/1982 | Iverson | 188/71.6 |
| 4,385,429 | 5/1983 | Crankshaw | 29/434 |
| 4,396,100 | 8/1983 | Eltze | 192/70.12 |
| 4,436,193 | 3/1984 | Smirl | 192/107 C |
| 4,560,048 | 12/1985 | Flotow et al. | 192/70.12 |

FOREIGN PATENT DOCUMENTS 440674 2/1927 Fed. Rep. of Germany ... 192/113 B

Primary Examiner—Richard M. Lorence
Attorney, Agent, or Firm—Willian Brinks Olds et al.

[57] ABSTRACT

A groove pattern for the friction facings of a wet clutch to equalize the face temperature of the friction facings and thus increase the thermal capacity of the clutch where there is continuous slippage. The groove pattern includes one or more circumferential grooves dividing the friction area into two or more annular bands with radial grooves in each band which increase in number from the inner band to the outer band.

8 Claims, 1 Drawing Sheet

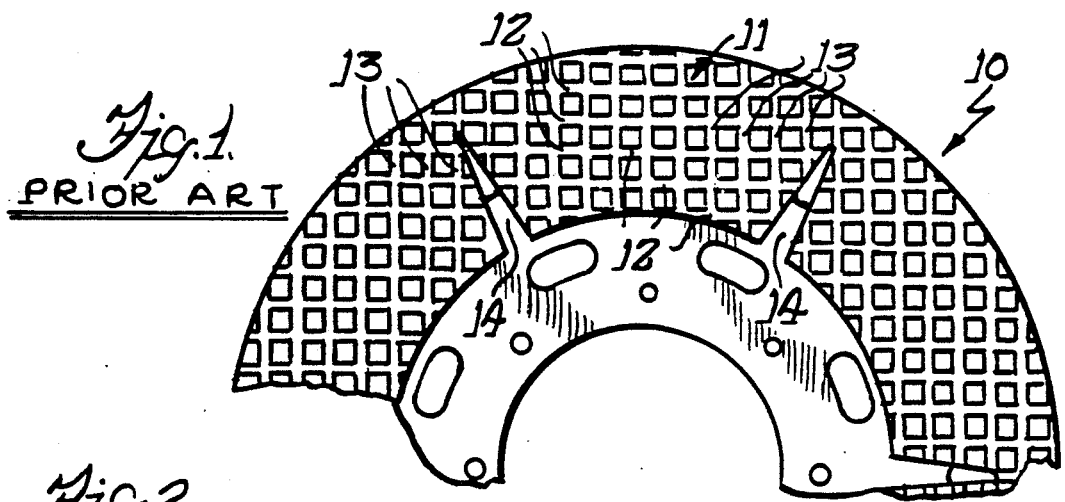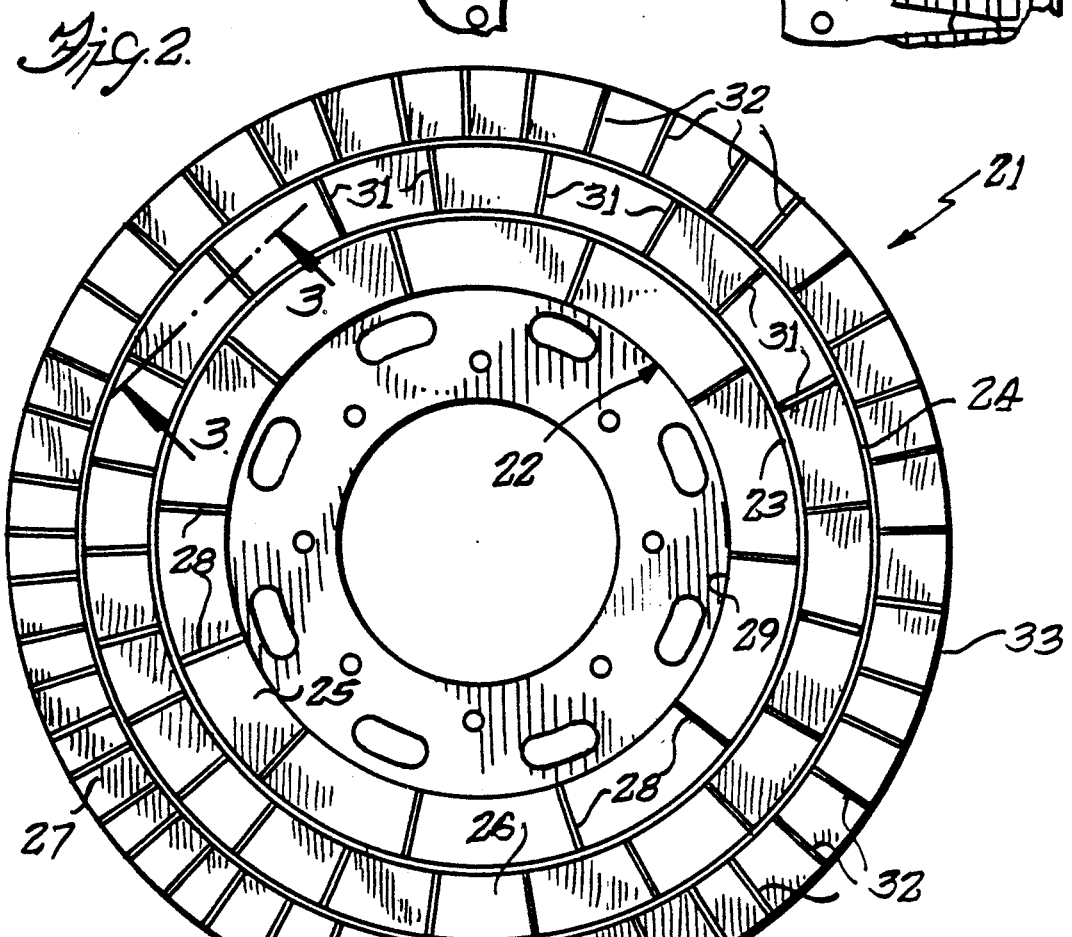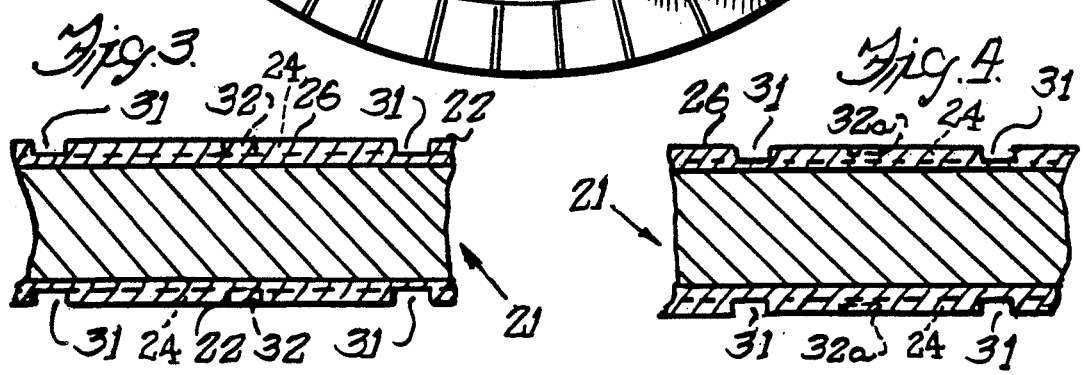

GROOVE PATTERN FOR HIGH THERMAL CAPACITY WET CLUTCH

BACKGROUND OF THE INVENTION

The present invention relates to an improved groove pattern for the friction facings of wet clutches.

Prior known clutch facings for wet clutches had a variety of groove patterns formed in the facing, the most common being the waffle pattern, such as shown in U.S. Pat. No. 4,280,609. In the waffle pattern, a series of parallel grooves intersect at right angles to a second series of parallel grooves. The oil or other cooling fluid for the wet clutch passes through the groove pattern from the inner edge to the outer edge of the friction facing under the impetus of centrifugal force.

Other types of conventional grooving patterns are shown in FIGS. 8 through 11 of U.S. Pat. No. 2,927,673. The typical waffle grooving pattern is shown in FIG. 7 of this patent, while a circumferential grooving pattern is shown in FIG. 8. FIG. 9 discloses a waffle pattern with curved grooves, FIG. 10 discloses straight grooves in an angled pattern, and FIG. 11 discloses radial grooves. Another known groove pattern is a single lead spiral groove pattern.

However all of the above groove patterns has the major disadvantage of a substantial temperature gradient across the width of the friction facing. The equilibrium temperature for the wet clutch facing is not uniform with the highest temperature occurring adjacent the outside diameter of the facing, and thus limits the thermal capacity of the clutch; while the capacity of a substantial portion of the clutch facing is underutilized. The present invention overcomes the disadvantages of prior known wet clutch face grooving patterns.

SUMMARY OF THE INVENTION

The present invention relates to an improved groove pattern for the friction facing of a wet clutch which will provide a more uniform temperature distribution across the clutch face and increase the clutch thermal capacity. The groove pattern includes one or more circumferential grooves dividing the friction area into two or more annular bands and a plurality of radial grooves extending between the circumferential grooves and between the inner diameter of the facing and the inner groove and between the outer groove and the outer diameter of the facing. Also, the radial grooves increase in number between the inner band and the outer band and need not be the same depth in different bands. In general, it is preferred to have decreasing groove depth between the inner and outer bands in order to achieve flow balancing and prevent emptying of the grooves due to centrifugal forces.

Further objects are to provide a construction of maximum simplicity, efficiency, economy and ease of operation, and such further objects, advantages and capabilities as will later more appear and are inherently possessed thereby.

DESCRIPTION OF THE DRAWINGS

FIG. 1 is a elevational view of a conventional wet clutch plate and facing showing a waffle groove pattern.

FIG. 2 is an elevational view of a wet clutch plate and friction facing having the improved groove pattern.

FIG. 3 is a partial cross sectional view taken on the line 3—3 of FIG. 2.

FIG. 4 is a partial cross sectional view similar to FIG. 3, but showing an alternate groove configuration.

DESCRIPTION OF THE PREFERRED EMBODIMENT

It has been known for some time that the temperature at the interface between the face and the metal mating face during continuous slipping of a wet clutch, such as occurs in starting clutches, reaches an equilibrium value established by a balance between the rate of heat generation and the rate of heat removal by the oil flowing in the grooves of the face. This equilibrium temperature, however, is not uniform over the friction face, but generally increases from the inside diameter to the outside diameter for the conventional groove patterns currently in use. The highest temperature, therefore, occurs at the outside diameter and limits the thermal capacity of the clutch, while the capacity of a substantial portion of the clutch facing is underutilized.

The commonly used grooving pattern shown in FIG. 1 is the conventional waffle groove pattern for the friction facings 11 of a wet clutch plate 10 and includes a plurality of grooves 12, 13 in the surface of each facing to form a waffle design or pattern. In this pattern, a plurality of generally parallel grooves 12 are formed in each facing extending in one direction, and a second plurality of parallel grooves 13 are arranged at right angles to the grooves 12. Additional radial tapered slots 14 may also be formed in the facing to enhance fluid distribution.

Advantages of the waffle pattern of grooving include a good distribution of oil to keep the entire surface wet resulting in desirable friction characteristics, and that the individual waffles or lands allow the friction plate 10 to conform to shift irregularities in the mating plate resulting in the absence of "hot spots". The major disadvantages of the waffle pattern include that only approximately one-half of the grooves, namely those in a more or less radial direction, participate actively in heat removal. Also, the land area per unit of total area is uniform as is the heat removal area per unit of total area. These two characteristics combine to give an interface temperature which is lowest at the inner diameter and highest at the outer diameter.

To overcome this interface temperature gradient across the clutch plate, the groove pattern of FIGS. 2 and 3 is utilized on the surfaces of friction facings 22 for a clutch plate 21. This improved grooving pattern includes two annular grooves 23 and 24 separating the facing into three annular areas or bands 25, 26 and 27. In the inner band 25 are located a plurality of circumferentially substantially equally spaced radial grooves 28 extending from the inner diameter 29 of the facing to the first annular groove 23. Likewise, in the intermediate band 26, there are formed a plurality of circumferentially substantially equally spaced radial grooves 31 extending between the annular grooves 23 and 24; the number of grooves 31 being greater than the number of grooves 28.

Further, in the outer band 27 are formed a plurality of circumferentially substantially equally spaced radial grooves 32 extending from the outer annular groove 24 to the outer diameter 33 of the facing; the number of grooves 32 being greater than the number of grooves 31 in the central band 26. As shown in the specific example of FIG. 2, there are eleven grooves 28, twenty-two grooves 31, and forty-four grooves 32. Although shown as doubling in number from band to band, other numbers of grooves may be used. Also, more than two circumferential grooves may be utilized in the facing resulting in more than three annular bands having the attendant radial grooves. If the friction band is too narrow, a single circumferential groove may used resulting in two bands with the outer band having a larger number of radial grooves than the inner band.

The purpose of the present invention is to redeploy the available groove area in a more efficient manner so that the interface temperature becomes nearly uniform and almost all of the groove area participates in cooling of the interface. However the improved pattern retains the advantages of the waffle pattern wherein the individual isolated land areas adjust independently of each other to minor irregularities on the surface of the steel mating plate with the absence of "hot spots". The land area per unit of total area is highest near the inner diameter in band 25 and decreases gradually toward the outside diameter, thus making the rate of frictional heat generation more uniform compared to other known patterns.

Also, the number of radial grooves increases from the inner to the outer diameter which brings about a nearly uniform temperature of the interface. It is this characteristic which allows uniform utilization of the interface thermal capacity and, therefore, in an increased overall capacity of the wet clutch. Also, the ratio of the width to the depth of the grooves may be in the order of 2:1 to improve the recirculation of oil within the grooves. The depth of the grooves need not be uniform, but the groove depth may vary in the various bands to achieve flow balancing and to prevent emptying of the grooves due to centrifugal forces upon rotation of the clutch plate. This generally requires the radial groove depth to decrease between the inner band and the outer band. Thus, as seen in FIG. 4, the grooves 32a in the outer band 27 are shallower than the grooves 31 in band 26. Likewise the grooves 31 may be shallower than grooves 28 in band 25. Also, the depth of the annular grooves 23 and 24 may be equal or groove 24 may be shallower than groove 23.

I claim:

1. A friction facing for a wet clutch plate comprising an annular facing having inner and outer diameters and a facing surface grooved to receive cooling oil, the improvement comprising that the grooving has a pattern including an annular groove intermediate the inner and outer diameters dividing said surface into two annular bands, and a plurality of radial grooves in each band connecting said annular groove with the inner or outer diameter of said facing, said radial grooves in the inner band being out of radial alignment with the radial grooves of the outer band, the depth of the radial grooves in the outer band is less than that for the radial grooves of the inner band.

2. A friction facing for a wet clutch plate comprising an annular facing having inner and outer diameters and a facing surface grooved to receive cooling oil, the improvement comprising that the grooving has a pattern including first and second annular grooves dividing said surface into three annular bands, and a plurality of radial grooves in each band connecting the inner diameter with the first annular groove, connecting said first and second annular grooves, and connecting said second annular groove with said outer diameter, the number of radial grooves in each band increasing from the inner to the outer band.

3. A friction facing as set forth in claim 2, wherein said radial grooves in each band are out of radial alignment with the radial grooves of the next adjacent band.

4. A friction facing as set forth in claim 2, wherein the radial grooves in the inner band terminate in said first annular groove, the radial grooves of the second annular band being out of alignment with the radial grooves of the first band and terminating in said second annular groove, and the radial grooves in said third annular band being out of alignment with the radial grooves of the second annular band.

5. The friction facing set forth in claim 2, wherein the depth of the radial grooves in each succeeding band decreases between the inner band and the outer band.

6. A friction facing for a wet clutch plate comprising an annular facing having inner and outer diameters and a facing surface grooved to receive cooling oil, the improvement comprising that the grooving has a pattern including two or more annular grooves dividing said surface into three or more annular bands, and a plurality of radial grooves in each band, the radial grooves in the innermost band connecting the inner diameter of the facing with the innermost annular groove, the radial grooves in each intermediate bands connecting the annular grooves on the opposite edges of such intermediate band and the radial grooves of the outermost band connects the outermost annular groove with said outer diameter of the facing, the number of radial grooves in each band increasing from the inner to the outer band.

7. The friction facing as set forth in claim 6, wherein the radial grooves in each band are out of alignment with the radial grooves in the next adjacent bands and the number of radial grooves increases in each succeeding annular band from the inner to the outer diameter.

8. A friction facing for a wet clutch plate comprising an annular facing having inner and outer diameters and a facing surface grooved to receive cooling oil, the improvement comprising that the grooving has a pattern including an annular groove centrally disposed between said inner and outer diameters dividing said surface into two annular bands, and a plurality of radial grooves in each band connecting said annular groove and the inner or outer diameter of said facing, said radial grooves in the inner band being out of radial alignment with the radial grooves of the outer band, the number of radial grooves in the outer band exceeding the number of radial grooves in the inner band, and the radial grooves in each band are substantially circumferentially equally spaced.

* * * * *